Patented Apr. 28, 1953

2,636,869

UNITED STATES PATENT OFFICE 2,636,869

PLASTIC MOLDING COMPOSITIONS

Donald A. de Tartas, Indianapolis, Ind., assignor to Radio Corporation of America, a corporation of Delaware No Drawing. Application May 4, 1951, Serial No. 224,681

8 Claims. (Cl. 260—28.5)

This invention relates to improved plastic molding compositions and to molded articles made of these compositions. More particularly the invention relates to molding compositions suitable for making high quality, semi-flexible phonograph records.

Three different types of materials are essential ingredients of the compositions and articles of the present invention. These three types of materials are (1) any one of a certain class of vinyl polymers and copolymers, (2) a chlorinated paraffin wax, and (3) a resin which is a product produced by reacting a terpene and a phenol in the presence of a molecular compound of boron trifluoride.

For some time it has been conventional practice in the phonograph record manufacturing industry to make the highest quality records from compositions consisting almost wholly of a synthetic resin, known as Vinylite, which is a copolymer of vinyl chloride-vinyl acetate, the latter ingredient being present in the amount of about 6–15% by weight. Only about 1.5–2 percent of the compositions from which these records are made comprises other ingredients such as stabilizers and coloring agents.

Records consisting almost entirely of Vinylite have certain advantages. They have excellent wear resistance, almost no surface noise when played, and they are virtually unbreakable.

There are, however, difficulties in manufacturing records consisting of nearly all Vinylite resin. It is difficult to mold fine groove sound records from this resin without having a high percentage of records which must be rejected because of the presence of an excessive number of minute unfilled spots causing "ticks" or "pops" when the record is played. Moreover, when an attempt is made to increase the plasticity of the resin during the molding operation, by the usual expedient of raising the molding temperature, the resin begins to decompose unless considerable quantities of stabilizing ingredients are used. Even with the stabilizing ingredients present, the molding operation is a difficult one to control perfectly.

Phonograph records made of almost 100% Vinylite have the added disadvantage of relatively high cost of manufacture. Because of the molding stiffness of the resin, substantial amounts of the usual phonograph record fillers cannot be used in record molding compositions containing Vinylite as the only resinous ingredient.

The present invention comprises improved synthetic resin compositions in which certain other ingredients are blended with Vinylite, or certain other vinyl resins, to improve the molding characteristics of the compositions without appreciable sacrifice in either wear resistance, warpage resistance, flexural strength or flexibility of the product. Substantial amounts of finely divided fillers may be included in the compositions without reducing wear resistance to an undesirable level and without reducing flexibility or flexural strength to objectionable values. The invention also includes sound records made of these compositions.

One object of the present invention is to provide improved plastic molding compositions.

Another object of the invention is to provide improved plastic molding compositions which include appreciable amounts of filler.

Another object of the invention is to provide improved plastic molding compositions of the type including filler and which have good molding properties.

Another object of the invention is to provide improved molding compositions which include certain vinyl resins and fillers.

Another object of the invention is to provide low cost phonograph records of improved quality.

Still another object of the invention is to provide improved sound records of the filled type.

These and other objects will be more apparent and the invention will be more readily understood from the description which follows:

In general, the present invention comprises plastic molding compositions in which the essential materials comprise about 55–65% by weight of a vinyl resin which may be one of the class consisting of polyvinyl chloride, copolymers of vinyl chloride-vinylidene chloride in which the latter ingredient is present in the amount of about 5–15% by weight, and copolymers of vinyl chloride-vinyl acetate containing about 6–15% of the acetate, about 10–20% by weight of a chlorinated paraffin wax, and a second resin which is described as a product produced by reacting a terpene and a phenol in the presence of a molecular compound of boron trifluoride, the resin having a melting point of about 93–95° C. The compositions also include about 12–25% by weight of conventional fillers and may include minor percentages of other ingredients such as resin stabilizers and coloring materials. The invention also includes sound records made of these compositions.

Specific examples of preferred compositions suitable for molding phonograph records will now be given.

Example I

| | Per cent by weight |
|---|---|
| Vinylite VYHH resin (12-15% polyvinyl acetate) | 61.5 |
| Chlorinated paraffin wax (Chlorowax No. 70, Diamond Alkali Co.) | 15.0 |
| Resin which is a product of reacting a terpene and phenol in presence of boron trifluoride (Newport-V40, Newport Industries, Inc.) | 5.0 |
| Dibasic lead stearate | 1.0 |
| Carbon black | 2.0 |
| Mineral filler (calcium carbonate) | 15.5 |
| | 100.0 |

In the above example, the Vinylite may be replaced by either of the other two vinyl resins previously mentioned. As also previously mentioned, the amount of this ingredient may be varied from about 55-65% of the composition.

The Chlorowax No. 70 is one example of a chlorinated straight chain hydrocarbon suitable for use in the invention. It is a 70% chlorinated paraffin hydrocarbon. The amount of this type of ingredient may be varied between 10-20% of the composition.

The second resin, Newport-V40, may be varied between about 3 and 7.5% of the composition. This resin is of the type described and claimed in U. S. Patent 2,343,845. As described in this patent, this resin is made by reacting a terpene such as turpentine, alpha pinene, or beta pinene with phenol in the presence of a molecular compound of boron trifluoride at a temperature of about 30°-70° C.

The combination of the chlorinated wax and second type of resins with the vinyl resin produces a molding composition which is much more plastic at its softening temperature than the vinyl resin, alone. For this reason, appreciable amounts of filler can be incorporated in the compositions and, if the amount of filler is kept within the range specified, phonograph records can be manufactured which have only slightly more surface noise, when played, than records made essentially of vinyl resins, alone, without filler. These records also have only slightly lower wear resistance and about 20% less flexibility than records made entirely of Vinylite, or the like resin. Flexural strength decreases with increase in the percentage of filler added. In the case of the 7 inch diameter, thin, lightweight record, especially adapted to be played on 45 R. P. M. record players, it has been found that very little more breakage with normal usage is likely to occur than with the more completely unbreakable, unfilled type of record. The slight disadvantages in wear and flexibility are, from the manufacturing standpoint, overshadowed by the considerable increase in plasticity at molding temperatures of compositions of the present invention. In the case of the composition set forth in the preferred example above, the increase in plasticity compared to straight Vinylite compositions is about 40%. The resulting increase in ease of molding and decrease in materials cost permits a saving in manufacturing cost, of the finished record.

The stabilizer of the above example is to prevent decomposition of the vinyl resin during processing. It can be varied in amount from about 0.5 to 2%. Many other stabilizers may be used instead of the one mentioned in the example. Most long chain fatty acid salts, such as zinc stearate or oleate, may be used. Fatty acid esters may also be used. Secondary function of the stearate type stabilizer is that of mold lubricant to facilitate removal of the molded article from the press.

The carbon black is employed as a coloring agent, in this case, and may be used in amounts varying from about 1-3% by weight of the compositions. It may be replaced with other coloring pigments or dyes which are compatible with the rest of the components.

Filler content may vary from about 12 to about 25%. Above 25%, if these compositions are used to make phonograph records, the record becomes undesirably brittle and wear resistance drops. Suitable filler materials include wood fillers, cotton floc, and the conventional mineral fillers, such as limestone, diatomaceous earth, and finely ground clays. Finely divided calcium carbonate fillers with 100% of the particles 10 microns, or less, in diameter, are preferred.

Another typical example of a composition suitable for making phonograph records follows:

Example II

| | Per cent by weight |
|---|---|
| Vinylite VYHH resin | 55.0 |
| Chlorowax No. 70 | 9.5 |
| Newport-V40 resin | 7.5 |
| Stabilizer | 1.0 |
| Carbon black | 2.0 |
| Calcium carbonate filler | 25.0 |
| | 100.0 |

Although the compositions described above have particular utility for making phonograph records, they may be used for general purpose molding. These compositions have been particularly designed, however, to meet the exacting standards of the phonograph record industry and the records produced therefrom are to be regarded as improvements over other filled type records.

What I claim is:

1. A plastic molding composition comprising about 55 to 65% by weight of a first resin from the class consisting of polyvinyl chloride, copolymers of vinyl chloride and vinylidene chloride containing about 5-15% by weight vinylidene chloride, and copolymers of vinyl chloride-vinyl acetate containing about 6-15% by weight vinyl acetate, about 10-20% by weight of a 70% chlorinated paraffin wax, about 3-7.5% by weight of a second resin which is a product produced by reacting a terpene and a phenol in the presence of a molecular compound of boron trifluoride at a temperature of about 30°-70° C., said second resin having a melting point of 93-95° C., and from about 12 to about 25% of a filler.

2. A composition according to claim 1 including about 61.5% of said first resin and in which said first resin is said vinyl chloride-vinyl acetate copolymer, about 15% of said wax and about 5% of said second resin.

3. A composition according to claim 2 in which said first resin contains 12-15% polyvinyl acetate and has an average molecular weight of about 10,000.

4. A composition according to claim 1 including also about 0.5 to about 2% by weight of a stabilizer for retarding thermal decomposition of said first resin and from about 1 to 3% by weight carbon black.

5. A composition according to claim 4 in which said stabilizer is dibasic lead stearate and is present in an amount of about 1%.

6. A sound record made of a composition comprising about 55 to 65% by weight of a first resin from the class consisting of polyvinyl chloride, copolymers of vinyl chloride-vinylidene chloride containing about 5-15% by weight vinylidene chloride, and copolymers of vinyl chloride-vinyl acetate containing about 6-15% by weight vinyl acetate, about 10-20% by wt. of a 70% chlorinated paraffin wax, about 3-7.5% by wt. of a second resin which is produced by reacting a terpene and a phenol in the presence of a molecular compound of boron trifluoride at a temperature of about 30°-70° C., said second resin having a melting point of 93-95° C., and from about 12 to about 25% of a filler.

7. A record according to claim 6 in which said first resin is a copolymer of vinyl chloride-vinyl acetate in which said vinyl acetate polymer is present in the amount of 12-15%.

8. A record according to claim 7 containing 61.5% by weight of said first resin, 15% by weight of said wax, and 5% by weight of said second resin.

DONALD A. DE TARTAS.

References Cited in the file of this patent

UNITED STATES PATENTS

| Number | Name | Date |
|---|---|---|
| 2,563,414 | Parker | Aug. 7, 1951 |